United States Patent [19]

Tunc

[11] 3,800,797
[45] Apr. 2, 1974

[54] BODY FLUID BARRIER FILMS
[75] Inventor: Deger Tunc, Edison, N.J.
[73] Assignee: Johnson & Johnson, New Brunswick, N.J.
[22] Filed: Jan. 15, 1973
[21] Appl. No.: 323,664

[52] U.S. Cl.......... 128/290 R, 117/143 A, 161/151, 260/224
[51] Int. Cl. ........................................ A61f 13/16
[58] Field of Search .......... 128/156, 284, 286, 287, 128/290, 296; 117/140, 143 A; 161/151, 169; 260/224

[56] References Cited
UNITED STATES PATENTS

| | | | |
|---|---|---|---|
| 3,480,016 | 11/1969 | Constanza et al. | 128/284 |
| 3,580,253 | 5/1971 | Bernardin | 128/290 W |
| 3,595,237 | 7/1971 | Sargent et al. | 128/290 R |
| 3,658,062 | 4/1972 | Kapur | 128/290 R |

*Primary Examiner*—Charles F. Rosenbaum

[57] ABSTRACT

A barrier film is provided for a product used in contact with body fluids. The barrier film comprises a sulfated alkali cellulose ether resin, the resin having a degree of sulfate substitution satisfactory to render the film resistant to body fluids and yet dispersible in low salt concentration aqueous solutions such as those found in a household water closet.

10 Claims, 6 Drawing Figures

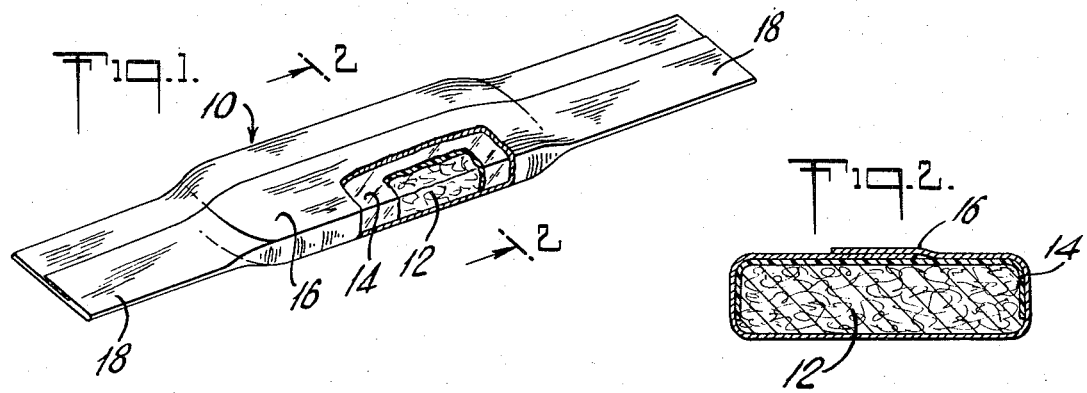
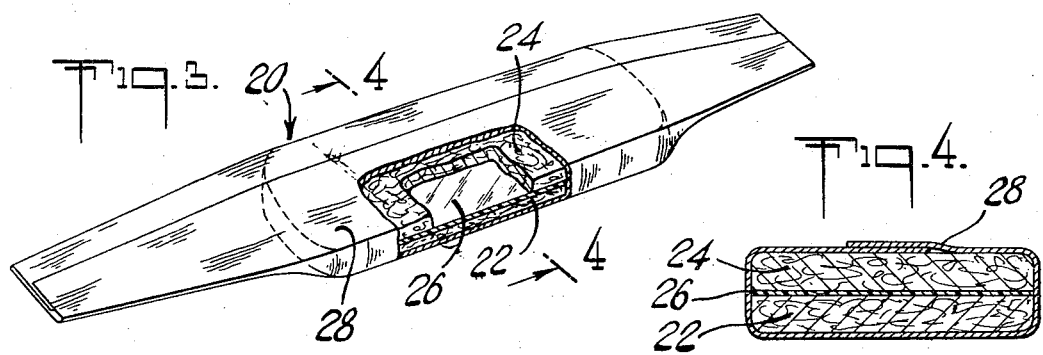
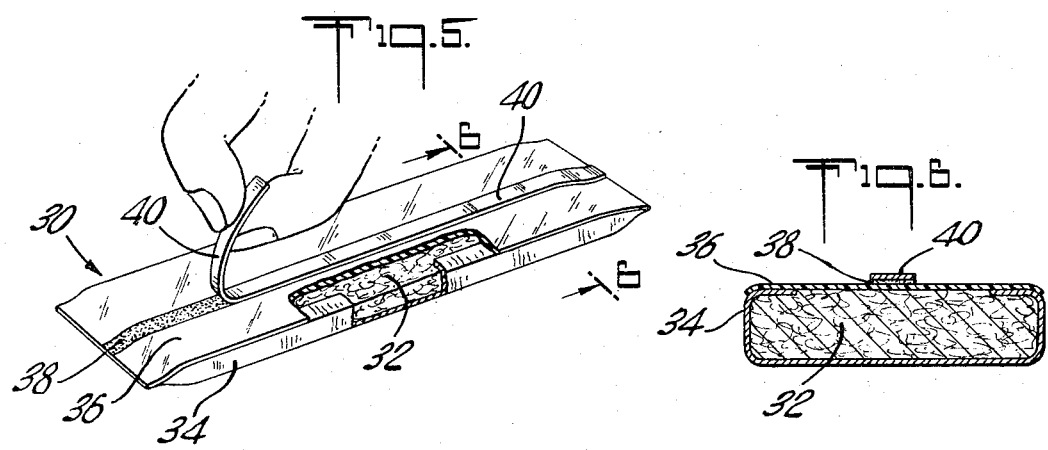

3,800,797

BODY FLUID BARRIER FILMS

BACKGROUND OF THE INVENTION

This invention concerns the incorporation of protective barrier films in products to be contacted in use with fluids exuded from the body such as blood, menstrual fluid and urine. Specifically, the barrier films of this invention are useful in connection with absorbent products such as sanitary napkins, diapers, dressings and the like and are likewise useful as liners for such products as bedpans and other receptacles. The films exhibit adequate tensile strength and retain their structural integrity when in contact with the aforesaid body fluids, and are still readily dispersible in water so that the film or the combination of film and product may be flushed away, after use, in a water closet.

Heretofore, the choice of suitable barrier films has been extremely limited in that those properties desirable in films used for this purpose, are infrequently found in combination. For example, the barrier film must be sufficiently strong to resist disintegration for a reasonable period of time when in use, i.e., the films must be insoluble or at least only slightly soluble in body fluids and must exhibit substantial tensile strength when subjected to such fluids. In conflict with this criterion, it is important that the barrier film be readily dispersible in water so that the absorbent product can be conveniently flushed away. Heretofore, barrier films have been incapable of adequately meeting both criteria.

A suitable barrier film must also have sufficient abrasive strength to withstand wear and tear when the product is one which is to be worn, such as a dressing, a sanitary napkin or a diaper, and at the same time, must be adequately soft and flexible so as to be comfortable and not exhibit the noise or rattling frequently associated with tough resinous films. Once more, these criteria are in conflict and a material suitably possessing both properties has heretofore been unknown.

SUMMARY OF THE INVENTION

In accordance with this invention, a barrier film is provided, in a product for contacting body fluids, which is dispersible in water and resistant to said body fluids, said barrier film comprising a film of sulfated alkali cellulose ether resin. Preferably said resin is chosen from the group consisting of alkali alkyl cellulose ethers, alkali hydroxyalkyl cellulose ethers, and alkali hydroxyalkyl alkyl cellulose ethers wherein each of the alkyl and hydroxyalkyl groups contain no more than four carbon atoms.

Examples of these resins are such alkali alkyl cellulose sulfates as sodium methylcellulose sulfate, potassium ethyl cellulose sulfate, sodium propyl cellulose sulfate and potassium butyl cellulose sulfate; such alkali hydroxyalkyl cellulose sulfates as sodium hydroxyethyl cellulose sulfate, potassium hydroxypropyl cellulose sulfate and sodium hydroxybutyl cellulose sulfate; and such alkali hydroxyalkyl-alkyl cellulose sulfates as sodium hydroxypropylmethyl cellulose sulfate, potassium hydroxyethyl, ethyl cellulose sulfate and sodium hydroxyethylpropyl cellulose sulfate.

It has now been discovered that these resinous films exhibit the unusual properties of retaining their tensile strength in salt solutions such as body fluids while readily dispersing in tap water. It has further been discovered that these unique properties are a function of the degree of sulfate substitution (hereinafter, "D.S.") which expresses the average number of sulfate groups per anhydroglucose unit of the cellulosic ether. In general, by increasing the D.S. of a particular resin, the films cast therefrom will exhibit increasing dispersibility in water and decreasing strength in salt solutions. It has been discovered that by utilizing resins having a D.S. varying from about 0.07 to about 0.4 a barrier film used, for example, as a protective barrier covering in an absorbent product such as a sanitary napkin or diaper or, alternatively, as a liner for a bedpan or like receptacle, will exhibit sufficient strength in body fluids and will readily disperse in water. Preferably, the D.S. should range from about 0.10 to about 0.30, and still more preferably 0.12 to 0.20.

The resins used in the products of this invention have been found to be compatible with a wide range of readily available plasticizers and, accordingly, these may be incorporated into the barrier film to produce a relatively noiseless, comfortable product such as an absorbent napkin or diaper without affecting its ability to disperse in water.

BRIEF DESCRIPTION OF THE DRAWINGS

FIG. 1 is a perspective view of a sanitary napkin embodying this invention with parts broken away to show the interior construction thereof;

FIG. 2 is a cross-sectional view taken approximately along lines 2—2 of FIG. 1;

FIG. 3 is a perspective view of a second sanitary napkin embodying this invention with parts broken away to show the interior construction thereof;

FIG. 4 is a cross-sectional view taken approximately along lines 4—4 of FIG. 3;

FIG. 5 is a perspective view of an absorbent pad or undergarment liner embodying this invention with parts broken away to show the interior construction thereof; and FIG. 6 is a cross-sectional view taken approximately along lines 6—6 of FIG. 5.

DETAILED DESCRIPTION OF THE INVENTION

The sulfated cellulose ethers, used to form the barrier films of this invention, may be produced by first forming the ether derivatives of cellulose and then sulfating with a suitable sulfating agent. The ether derivatives are generally prepared by reacting a purified form of cellulose with either an alkyl halide, an alkylene oxide or both to form either the alkyl ether, the hydroxyalkyl ether or the hydroxyalkyl-alkyl ether, respectively. Unsulfated cellulose ethers are presently available as, for example, the methyl cellulose and hydroxypropyl methyl cellulose ethers sold under the trademark METHOCEL and the ethyl cellulose ethers sold under the trademark ETHOCEL, all available from the Dow Chemical Company, Inc. of Midland, Michigan, as well as the ethyl cellulose, hydroxyethyl ethyl cellulose and hydroxypropyl cellulose ethers available from Hercules, Incorporated and the Union Carbide Corporation.

Table I below illustrates properties of typical ethers suitable for sulfating and use in accordance with this invention:

TABLE I

| Compound | Viscosity | Degree of Alkyl Group Substitution |
|---|---|---|

| | | |
|---|---|---|
| Ethyl Cellulose | 4–5000 cps[1] | 2.21–2.58[3] |
| Methyl Cellulose | 8–10,000 cps[2] | 1.64–1.92[3] |
| Hydroxypropyl Methyl Cellulose | 50–60,000 cps[2] | 19–33% by weight methyl 4–12% by weight propylene glycol ether |

[1] 5% (by weight) ethyl cellulose in 80/20 (by weight) Toluene/Ethanol at 25°C.
[2] 2% (by weight) Aqueous Solution at 20°C.
[3] The average degree of substitution of alkyl groups per anhydroglucose unit.

The ethers may be sulfated in accordance with a process described in U.S. Patent application, Ser. No. 232,371, filed Mar. 7, 1972, whereby an alkali sulfating agent is prepared by reacting acetic anhydride with sulfuric acid and an alkali sulfate, all in an acetic acid solution to form alkali acetyl sulfate. The alkali acetyl sulfate is then reacted with the cellulose ether to yield the sulfated alkali cellulose ether resin herein.

Films may be cast by dissolving the resins in a suitable solvent, applying the solution onto a release surface and allowing the solvent to evaporate, leaving behind a film which is then peeled from the release surface. A wide variety of solvents may be used including, for example, water, methanol, ethanol, methylene chloride, methyl or ethyl ketone or various combinations of these. The resin concentrations are limited, on the one hand, by the necessity for maintaining the solution sufficiently dilute so as to exhibit good fluidity and, on the other hand, by the necessity for maintaining the solution sufficiently concentrated so as to limit the volume to be handled to a convenient quantity. In general, it has been discovered that films having thicknesses varying from 0.1 to 5.0 mils can conveniently be prepared from solutions containing about one to about ten percent by weight of sulfated cellulose ether and preferably from solutions containing about two to five percent by weight of ether. The films are cast on suitable release surfaces such as glass or Teflon coated surfaces. For example, excellent translucent, peelable films are obtained from a sulfated ethyl cellulose resin dissolved in a 1:1 (by volume) mixture of methanol and methyl chloride and cast, at room temperature, onto a Teflon coated pan.

The films of this invention, cast from sulfated cellulosic ethers, are uniquely suited for use as flushable barrier films in a product used in contact with such body fluids as blood, menstrual fluid, urine, etc. These fluids, in general, exhibit properties which, with respect to the films, are analagous to the aqueous salt solution having a salt content which varies from about 0.8 to about 1.5 percent by weight of sodium chloride. On the other hand, tap water normally supplied to water closets and the like generally has an extremely low salt concentration of less than about 250 parts per million of chloride ion. It has been discovered that the sulfated cellulosic ethers of this invention maintain their integrity for a substantial period of time in solutions having a salt concentration exhibiting the properties of body fluids, whereas, surprisingly, they display a far lower resistance to dispersion in tap water. It has further been discovered that modifying the D. S. of these resins, the salt resistances and water dispersability of the films can be modified to suit the particular purposes of this invention, i. e., films which will adequately provide a barrier for body fluids for a suitable length of time and which may be flushed away in a water closet.

Specifically, by lowering the degree of sulfation, the barrier films of this invention become more resistant to salt solutions in that they retain their integrity after being subjected to these solutions for longer periods of time and that they exhibit higher tensile strengths when subjected to a given salt concentration for a given period of time. In general, if the D. S. is maintained, at below about 0.4 an adequately salt resistant film results. Preferably, the D. S. should be maintained at below about 0.3 and more preferably below 0.2. While the resistance of the films to salt solutions having a salt concentration exhibiting the properties of body fluids increases greatly with decreasing D. S., the ability to disperse readily in tap water is maintained until extremely low D. S. values are reached. Adequate tap water dispersibility is achieved when the D. S. is maintained at a value of at least about 0.07. Preferably, the D. S. should not be less than about 0.1 and more preferably not less than about 0.12.

The barrier films of this invention are highly compatible with a great variety of plasticizers which may be incorporated therein to improve such characteristics of the film as flexibility, resistance to abrasion, and "noise," i. e., the rattle resulting from the flexing of the film. These properties are particularly important when the barrier films are used in connection with items to be worn such as the aforementioned sanitary napkins, diapers and the like. Water soluble plasticizers such as glycerol and polyethylene glycol are suitable, as well as such water-insoluble plasticizers as castor oil.

When the films of this invention are used in connection with such products as liners for bedpans and other receptacles for body fluids, they may be cast directly on the inside surface of the receptacle prior to use or may alternatively be precast and then applied to the receptacles. In use, after fluid has been deposited into the lined receptacle, the entire liner, including the deposited fluid may be lifted out of the receptacle and deposited in a water closet. The films of this invention will exhibit sufficient tensile strenth when in contact with the deposited fluid to allow the liner to be lifted out of the receptacle and will at the same time be completely dispersible in a water closet so as to be flushable.

Referring now to FIGS. 1 and 2 of the drawing, illustrated therein is an embodiment of the films of this invention as used with a sanitary napkin 10. The napkin comprises an absorbent core 12 of fibrous material such as comminuted woodpulp fibers, cotton linters, rayon fibers, cotton staple, bleached sulfite linters, other cellulosic or modified cellulosic fibers and the like. Overlying the bottom surface of the absorbent core (that portion of the napkin worn away from the body) is a thin barrier sheet 14 comprising the films of this invention. A fluid pervious cover 16 surrounds the absorbent core 12 and the barrier sheet 14 with the lateral edges thereof overlapped and secured on the bottom surface of the napkin 10. The cover 16 can be extended beyond the ends of the core 12 to form the usual attachment tabs 18. While FIGS. 1 and 2 illustrate a tabbed napkin, it will be understood by one skilled the art that the advantages accruing to the use of barrier films of this invention are equally applicable to a tabless product, e.g., one where tabs are not used as attachemnt means and other attachment means such as, for example, adhesive means, are used.

As incorporated into the product described in FIGS. 1 and 2, the barrier sheet, comprising films of this invention, is uniquely suited to preclude the passage of menstrual fluid through the core to the bottom surface of the napkin. Menstrual fluid, as other body fluids, exhibits properties, with respect to the film, which are analogous to an aqueous solution having a salt content of about 0.8 to about 1.5 percent by weight and it is within these concentrations that the films of this invention are resistant and impermeable. Notwithstanding the resistance of the films to menstrual fluid when the films are introduced into an aqueous low salt concentration solution, they are dispersible. Accordingly, by employing a water dispersible material for the cover 16 (and a water dispersible core 12) the sanitary napkins of FIGS. 1 and 2 may be completely disposed of in a water closet. Alternatively, the illustrated napkin may be provided with a non-water dispersible cover, in which event the cover would first be removed and the pad and barrier film dropped into a water closet for disposal. In either event, the unique barrier film of this invention will completely disperse in a water closet under the swirling action of the low salt concentrations found therein, and will in no way clog or otherwise impair the operation of the water closet and associate plumbing.

FIGS. 3 and 4 illustrate a second embodiment of this invention in a napkin of alternative construction. A sanitary napkin 20 is provided with first and second absorbent layers 22 and 24. Sandwiched therebetween is a barrier sheet 26 comprising the film of this invention. A fluid pervious cover 28 surrounds the absorbent layers 22 and 24, with the lateral edges thereof overlapped and secured on the bottom surface of the napkin 20. As in the prior described embodiment, the cover is illustrated as extending beyond the absorbent layers to form attachment tabs, although it is equally advantageous to use the teachings of this invention in a tabless product. Again the films of this invention are uniquely suited for use as barrier films and while they will preclude the passage of menstrual fluid to the bottom of the napkin, they are completely dispersible in a water closet. Hence, if the napkin 20 is provided with a water dispersible cover, it may be completely disposed of by flushing or, alternatively, if the napkin is provided with a non-water dispersible cover, the cover may be first removed and then the remainder of the napkin may be disposed of by flushing. A particular advantage of a napkin having the construction illustrated in FIG. 20 is that the barrier film located between absorbent layers is less likely to exhibit "noise" which could embarrass the wearer and hence the need for the addition of plasticizers to the film is lessened.

In this connection, it will be apparent to one skilled in the art that, while two separate absorbent layers have been illustrated, many alternatives are possible, such as, for example, the use of multiple layers or the forming of the layers by simply folding a single sheet of absorbent material.

FIGS. 5 and 6 illustrate still another embodiment of this invention. Illustrated therein is an absorbent pad 30 which is useful as a protective cover for undergarments. The pad is provided with an absorbent core 32. A fluid pervious cover 34 overlies the top (the surface worn against the body) and side portions of the core, the lateral edges also overlying the peripheral portions of the bottom surface of the core. A barrier film 36, in accordance with this invention, is provided to overlie the bottom surface of the core and those portions of the cover 34 overlying the bottom surface. The barrier sheet 36 and the cover 34 are secured together and preferably, are secured to the core. The outer surface of the barrier sheet is provided with adhesive means 38 which may be, for example, a layer of pressure sensitive adhesive or a double-faced adhesive tape. The adhesive means 38 is protected, prior to use by a strippable peelable cover 40. In use, the cover 40 is stripped from the napkin exposing the adhesive means. The napkin is then placed, for example, in the crotch portion of a panty and held in place by adhering the barrier film portion to the panty with the adhesive means. Once again, the unique features of the barrier film allow the pad to be readily disposed of by flushing in a water closet.

In order to better illustrate the invention, the following examples are given:

EXAMPLE I

A barrier film, suitable for use in accordance with the teaching of this invention, is prepared as follows:

A sulfating agent, sodium acetyl sulfate, is prepared by combining the following ingredients:

|  | Parts by Weight |
|---|---|
| Sodium Sulfate | 8.1 |
| Acetic Anhydride (98% pure) | 42.8 |
| Glacial Acetic Acid | 13.8 |
| Sulfuric Acid (95% pure) | 5.3 |

The sodium sulfate is first added to a mixture of the acetic anhydride and acetic acid at room temperature, the sulfuric acid then being added at a rate such that the temperature of the mixture does not exceed 54.4°C. The resulting solution is neutralized by adding small increments of additional sodium sulfate and is then cooled to 4.4°C. and filtered.

ETHOCEL Std., a trademark of the Dow Chemical Company for ethyl cellulose ether, is dissolved in acetic acid in a proportion of 45.4 parts by weight of resin in 115 parts of acetic acid. ETHOCEL Std. has a degree of ethyl substitution of 2.46 to 2.58 and a 5 percent by weight solution of the resin dissolved in a solvent mixture of toluene and ethyl alcohol in the proportions of 80 to 20 parts by weight, respectively, and measured at 25°C. has a viscosity of 40 to 50 cps. The resin is dissolved in the acetic acid by mixing, in a jacketed, sigma blade mixer, for about 30 minutes at a jacket temperature of 38°C. The jacket temperature is then dropped to 15°C. and held at that temperature until the reaction mixture has cooled at 21°C.

The sulfating solution is then added incrementally over a period of 20 minutes, taking care not to exceed a reaction temperature of 32°C. The resulting reacted mixture is then added to an aqueous, ten percent by weight, sodium hydroxide solution in a ratio of one part by weight of reacted mixture to ten parts by weight of the sodium hydroxide solution. This mixture is stirred vigorously and the pH is maintained at approximately ten by the addition of requisite quantities of additional 10 percent sodium hydroxide solution.

The resulting precipitated resin is separated from its mother liquor by filtering in a Buchner funnel. The precipitate is then dried at a temperature of 50°C. in a forced-air oven and ground in a Wiley mill, to a particle size of from one to two millimeters in diameter. The ground particles are washed by combining them with ten times their weight of boiling water and stirring vigorously while adjusting the pH to a value of 5.5 with the addition of 10 percent by weight of hydrochloric acid solution. The precipitate resulting from this washing step is filtered, dried and ground in the manner described above. The washing step and the filtering, drying, and grinding are repeated once again.

The resulting resin has a degree of sulfate substitution of 0.43. The resin is dissolved in methanol to a concentration of 6.6 percent by weight. A film is cast with this solution in an 8 × 8 inch Teflon coated pan. The resulting film peels easily from the Teflon pan and is translucent and flexible.

EXAMPLE II

A series of resins are produced in accordance with the method described in Example I with the exceptions that the relative quantity of sulfating agent is varied in each, as tabulated in Table II below, to provide a varying D. S. The viscosity of the unsulfated ETHOCEL is likewise varied as shown in Table II. A series of films are cast from each of the resins and tested to determine their respective abilities to maintain structural integrity, hereinafter the break up time, is measured by placing a 3 cm square film sample having a thickness of about 2 mil (±0.3 mils) into a 250 ml beaker and covering said sample with 150 ml of the test liquid. The beaker is then stirred with a magnetic stirrer having a Teflon coated magnet rotating at 90 rpm. The time elapsed before the sample disintegrates is the break up time and is reported in Table II.

The films are further tested to determine their respective tensile strength when subjected to various liquids for various periods of time. Film samples measured three inches by one inch are immersed in the particular test liquid for the specified period of time and then immediately tested in an Instron machine, at a jaw separation of two inches and a crosshead speed of two inches per minute. The results of these tests, as well as the dry tensile strengths are reported in Table III.

integrity and to support a load as functions of both the salt concentration and the D.S. of the starting resin. The films cast from the highly sulfated resins are relatively soluble in both distilled water and a 0.9 percent sodium chloride solution and so lose their structural integrity in a relatively short period of time, although it should be noted that even for these relatively soluble, highly sulfated resinous films, there is a marked difference in the break up time when the films are alternatively subjected to the two different fluids. As the D.S. of the starting resins is decreased, a rapid increase in the time is noted for the films in contact with the 0.9 percent sodium chloride solution whereas, for those films in contact with the water, the elapsed time, while increasing with decreasing D.S. does so at a significantly slower rate, thereby resulting in the differential resistance to disintegration, unique to the barrier films of this invention. At extremely low D.S. values, the elapsed time in both solutions is quite long.

A similar functional relationship between decreasing D.S. value and salt resistance is noted in the tensile strength test. Generally, it is noted that the ability to withstand tensile stress when in contact with aqueous fluids increases with decreasing D.S. value. This property is of great significance when the barrier films are to be used as a bedpan liner, for example. Further, in accordance with the teachings of the invention, the functional relationship with respect to salt sensitivity should be noted, i.e., the rate of increase in stress bearing ability with decreasing D.S. value is far greater in 0.9 percent sodium chloride solutions than in water.

To illustrate the salt sensitivity for a wide range of sulfated cellulosic ether films, the following example is given.

EXAMPLE III

Films are prepared from partially sulfated sodium methyl cellulose sulfate, sodium ethyl cellulose sulfate and sodium hydroxypropyl cellulose sulfate, the films being prepared as follows:

Partially sulfated sodium ethyl cellulose sulfate is prepared in accordance with the method of Example I to produce a resin having a D.S. value of 0.47. A film is prepared from this resin in accordance with Example I. Partially sulfated sodium methyl cellulose ether is prepared from METHOCEL MC, a trademark of the Dow Chemical Company, Inc., for methyl cellulose ether having a degree of methyl substitution of 1.64 to 1.92 and a viscosity of about 8,000 cps when a 2 percent aqueous solution is measured at 20°C. The sulfating is carried out following the procedure described in Example I using the sulfating agent prepared in accor-

TABLE II

| Sample | D.S. | Viscosity of Unsulfated ETHOCEL (centipoises) | Break Up Time (Sec.) | | |
|---|---|---|---|---|---|
| | | | $H_2O$ | 0.9% by Weight NaCl | 1.6% by Weight NaCl |
| 1 | 0.45 | 50 | 20 | 30 | 110 |
| 2 | 0.277 | 45 | 20 | 110 | |
| 3 | 0.229 | 90 | 39 | 90 | |
| 4 | 0.206 | 45 | 60 | | |
| 5 | 0.199 | 45 | 120 | 660 | |
| 6 | 0.193 | 45 | 138 | >48 hr. | |
| 7 | 0.175 | 90 | 330 | >48 hr. | |
| 8 | 0.166 | 90 | 187 | >48 hr. | |
| 9 | 0.163 | 90 | >2 hr. 20 min. | | |
| 10 | 0.151 | 90 | >26 hr. | | |
| 11 | 0.127 | 90 | | | |

TABLE III

| Sample | D.S. | Viscosity of unsulfated Ethocel | Tensile strength/sample thickness (lbs. per square in./mil.) | | | | | |
|---|---|---|---|---|---|---|---|---|
| | | | 30-minute immersion | | | 120-minute immersion | | |
| | | | $H_2O$ | 0.9% by wt. NaCl | 2.0% by wt. NaCl | $H_2O$ | 0.9% by wt. NaCl | 2.0% by wt. NaCl |
| 1 | 0.45 | 50 | (*) | (*) | (*) | (*) | (*) | (*) |
| 2 | 0.277 | 45 | (*) | (*) | (*) | (*) | (*) | (*) |
| 3 | 0.229 | 90 | (*) | (*) | (*) | (*) | (*) | (*) |
| 4 | 0.206 | 45 | (*) | 40/1.7 | 92/1.8 | (*) | (*) | 103/1.8 |
| 5 | 0.199 | 45 | (*) | (*) | 113/1.9 | (*) | (*) | 78/2.1 |
| 6 | 0.193 | 45 | (*) | 85/2.2 | 211/2.3 | (*) | 52/2.1 | 175/2.2 |
| 7 | 0.175 | 90 | 18/2.4 | 454/2.3 | 596/2.9 | (*) | 441/2.5 | 546/2.4 |
| 8 | 0.166 | 90 | 368/2.9 | 408/2.6 | 595/3.0 | 323/2.7 | 431/2.4 | 671/2.6 |
| 9 | 0.163 | 90 | 609/2.5 | 668/2.5 | 878/2.4 | 529/2.5 | 652/2.4 | 890/2.4 |
| 10 | 0.151 | 90 | 1,097/2.3 | 1,118/2.6 | 1,360/2.3 | 846/2.6 | 948/2.7 | 1,135/3.0 |
| 11 | 0.127 | 90 | 1,499/2.3 | 1,388/2.0 | 1,567/2.1 | 1,259/2.3 | 1,470/2.2 | 1,328/2.3 |

*Sample does not have sufficient structural integrity to measure.

Tables II and III clearly illustrate the variation in the films with respect to their ability to maintain structural dance with that example and resulting in a resin having a D.S. value of 0.29. A film is cast from this resin from a 6.6 percent by weight methanol solution. A translucent, flexible, peelable, film results.

Partially sulfated sodium hydroxypropyl methyl cellulose sulfate is prepared from METHOCEL HG, a trademark of the Dow Chemical Company, Inc., for hydroxypropyl methyl cellulose ether having a weight percent substitution of 19–33 percent methoxyl and 4–12 percent propylene glycol ether and a viscosity (Ubbelonde viscometer) of about 4,000 cps. when a 2 percent aqueous solution is measured at 20°C. The sulfating is carried out following the procedure described in Example I using the sulfating agent prepared in accordance with that example and resulting in a resin having a D. S. value of 0.31. A film is cast from this resin from a 6.6 percent by weight methanol solution. Again, a translucent, flexible, peelable film results.

To test the salt sensitivity of these films, two 3 cm by 3 cm samples of each of these aforementioned films are submerged in a well-stirred bath of water and an aqueous 1.6 percent by weight sodium chloride bath solution, both baths being maintained at a temperature of about 24°C. The time required for each of the films to disintegrate is reported below. The break up time of samples of each of these films are tested in accordance with the method of the preceding example and are recorded in Table IV below.

TABLE IV

| Film Component | D. S. | Break Up Time H$_2$O | 1.6% Na Cl |
|---|---|---|---|
| Sodium Methyl Cellulose Sulfate | 0.29 | 4 min. 30 sec. | 13 min. 30 sec. |
| Sodium Ethyl Cellulose Sulfate | 0.47 | 20 sec. | 1 min. 50 sec. |
| Sodium Hydroxypropyl Methyl Cellulose Sulfate | 0.31 | 1 min. 53 sec. | 4 min. 31 sec. |

As shown in the above table, each of the resinous films exhibited a greater resistance to the salt solution than to deionized water, this property being unique to the films of this invention.

To illustrate the compatability of the barrier films of this invention, with plasticizers, the following example is given.

EXAMPLE IV

The procedures of Example I are used to produce partially sulfated sodium ethyl cellulose sulfate with the exception that in the case indicated in the table below, various plasticizers were incorporated into the casting solutions. These films were then tested in accordance with the tensile strength test described above to determine the effect of the plasticizers on the salt sensitivity of the films. The results are reported in Table V.

EXAMPLE V

Sanitary napkins are prepared using the napkin construction of a commercially available napkin sold by Personal Products Company, a corporation of Milltown, New Jersey, under the trademark Regular MODESS Blue Shield "G" -construction and generally illustrated in FIG. 1 and 2 of the drawings. In place of the polyethylene film barrier normally provided in such napkins, films measuring 7.3 inches by 3.5 inches were employed. The films were all prepared from sodium ethylcellulose sulfate resin having a D. S. value of 0.28.

Dynamic form tests are performed by suspending each of the napkins comprising the aforementioned sulfated cellulose ether resin film, as well as a napkin comprising the standard polyethylene film, across a rubber mold which simulates the female form. The form is set into motion by means of a set of gears, cams and rods and an ersatz menstrual fluid is allowed to drip onto the napkin to simulate in-use conditions. The fluid, having the composition given below, is applied at a rate of 0.29 cubic centimeters per minute and the form is operated at a speed of 60 cycles per minute.

The fluid capacity of the napkin under dynamic conditions is measured by the total volume of fluid applied at the time of failure, i. e., the time at which spotting is noted on the underside of the napkin. This quantitative test is translated qualitatively as follows:

| Fluid Capacity at Failure (cc of Liquid) | Rating |
|---|---|
| 20 | Excellent |
| 15 | Very Good |
| 10 | Good |
| 7 | Fair |
| 5 | Inadequate |

The results of the dynamic test are given below. Unless indicated otherwise, a one-ply barrier film is employed.

TABLE V

| Sample | Barrier Film Thickness (mils) | Fluid Capacity (cc liq.) | Qualitative Rating |
|---|---|---|---|
| 1 | 0.6 | 17.1 | very good – excellent |
| 2 | 1.2 | 13.1 | good – very good |
| 3 | 1.8 | 24.6 | excellent |
| 4 | 1.8 (double ply) | 16.5 | very good – excellent |
| Polyethylene Film | 0.6 | 19.6 | very good – excellent |

As shown in the above table, the barrier films of this invention performed comparably to the standard polyethylene film and, in contrast to the standard film, has the advantage of being flushable.

It should be appreciated by one skilled in the art that based on the teachings of this invention, films may be designed to particularly function in a specific capacity. For example, when used in napkins, it is clear that the barrier films contact only absorbent materials dampened with menstrual fluid whereas when dispersed of, the napkins are fully immersed in a swirling tap water environment. Accordingly, barrier films used for those purposes may be designed so as to be thinner and a wide range of D. S. may be employed. On the other hand, where the films are used as a liner for bedpans, the films are generally immersed in body fluid and may have to remain in such a condition for a substantial time. Accordingly, thicker, more salt resistant films should be used.

The resins of this invention may be combined with other materials and will still exhibit the salt sensitive features when cast into film form. For example, successfully salt sensitive films have been produced by combining sodium ethyl cellulose sulfate with such diverse and substantially less expensive materials, such as titanium dioxide, kaolin and acrylic resin, these materials being referred to herein as inexpensive extenders. Films have been cast from solutions of such mixtures in methanol solvent and have preserved the salt sensitive characteristics of those films described above while, by virtue of the use of these inexpensive extenders have substantially decreased the cost of the films.

It will be apparent to one skilled in the art that many modifications to the invention are possible without departing from the scope and spirit thereof.

What is claimed is:

1. In a product for contacting body fluids, a barrier film comprising a sulfated alkali cellulose ether resin, said resin having a degree of sulfate substitution satisfactory to render said film resistant to said body fluids and dispersible in a water closet.

2. The product of claim 1 wherein the sulfated alkali cellulose ether has a degree of sulfate substitution of about 0.07 to about 0.4.

3. The product of claim 2 wherein the sulfated alkali cellulose ether is a sulfated alkali alkyl cellulose ether, said alkyl group having from one to four carbon atoms.

4. The product of claim 2 wherein the sulfated alkali cellulose ether is a sulfated alkali hydroxyalkyl cellulose ether, said alkyl group having from one to four carbon atoms.

5. The product of claim 2 wherein the sulfated alkali cellulose ether is a sulfated alkali hydroxyalkyl alkyl cellulose ether, said alkyl groups each having from one to four carbon atoms.

6. The barrier film of claim 1 wherein said body fluid contacting product is a sanitary napkin.

7. The barrier film of claim 1 wherein said body fluid contacting product is a bedpan.

8. The barrier film of claim 1 wherein said film further comprises a plasticizer.

9. The barrier film of claim 1 wherein said film further comprises an inexpensive extender.

10. The barrier film of claim 1 wherein said body fluid contacting product is a diaper.

* * * * *